(12) United States Patent
Li et al.

(10) Patent No.: US 11,796,299 B2
(45) Date of Patent: Oct. 24, 2023

(54) PIPELINE THREE-DIMENSIONAL CURVE MEASURING ROBOT AND IMPLEMENTATION METHOD THEREFOR

(71) Applicant: SHENZHEN UNIVERSITY, Guangdong (CN)

(72) Inventors: Qingquan Li, Shenzhen (CN); Zhipeng Chen, Shenzhen (CN); Yu Yin, Shenzhen (CN); Xiang Cheng, Shenzhen (CN); Jiasong Zhu, Shenzhen (CN)

(73) Assignee: SHENZHEN UNIVERSITY, Shenzhen (CN)

(*) Notice: Subject to any disclaimer, the term of this patent is extended or adjusted under 35 U.S.C. 154(b) by 723 days.

(21) Appl. No.: 16/969,654

(22) PCT Filed: Nov. 28, 2019

(86) PCT No.: PCT/CN2019/121384
§ 371 (c)(1),
(2) Date: Aug. 13, 2020

(87) PCT Pub. No.: WO2020/151363
PCT Pub. Date: Jul. 30, 2020

(65) Prior Publication Data
US 2020/0400419 A1    Dec. 24, 2020

(30) Foreign Application Priority Data

Jan. 21, 2019    (CN) .......................... 201910054508.2

(51) Int. Cl.
*G01B 5/20*    (2006.01)
*F16L 55/30*    (2006.01)
(Continued)

(52) U.S. Cl.
CPC ............... *G01B 5/20* (2013.01); *F16L 55/30* (2013.01); *F16L 55/48* (2013.01); *G01B 5/12* (2013.01);
(Continued)

(58) Field of Classification Search
CPC .......... G01B 5/20; G01B 5/12; G01C 21/165; F16L 55/30; F16L 55/48
(Continued)

(56) References Cited

U.S. PATENT DOCUMENTS 1,805,343 A * 5/1931 Robbins .................. G01B 5/08
                                                              73/152.57
2,980,854 A * 4/1961 En Dean ................. C23F 13/04
                                                              346/33 S
(Continued)

FOREIGN PATENT DOCUMENTS

CN    103244830 A    8/2013
CN    104567915 A    4/2015
(Continued)

OTHER PUBLICATIONS

Examination Report dated Feb. 3, 2020 of corresponding Chinese application No. 201910054508.2; 16 pages.
International Search Report dated Feb. 28, 2020 in corresponding International application No. PCT/CN2019/121384; 6 pgs.

*Primary Examiner* — Christopher W Fulton
(74) *Attorney, Agent, or Firm* — Maier & Maier, PLLC

(57) ABSTRACT

A pipeline three-dimensional curve measuring robot and implementation method therefor. The measuring robot includes an electronic bin, sliding rods, wheel bracket, walking wheels arranged on wheel bracket, odometer wheels arranged on sliding rod on one side and encoders; the electronic bin is internally provided with an inertia measurement unit, collection control module and power supply module; when measuring, the measuring robot is controlled
(Continued)

to move back and forth in a pipeline collecting measuring data; comparing measured data with three-dimensional curve data at pipeline reference moment to obtain deformation quantity of pipeline three-dimensional curve. For the measuring robot provided, measuring robot measuring points are realized to be kept on a central axis of the pipeline through synchronous tensioning of walking wheels, realizing high-precision mileage measurement through independent tensioning of odometer wheels; inertial navigation measuring device can realize millimeter-scale pipeline three-dimensional curve deformation measurement accuracy and meets requirement for deformation monitoring.

12 Claims, 5 Drawing Sheets

(51) Int. Cl.
*F16L 55/48* (2006.01)
*G01B 5/30* (2006.01)
*G01C 21/16* (2006.01)
*G01B 5/12* (2006.01)
*F16L 101/30* (2006.01)

(52) U.S. Cl.
CPC ............ *G01B 5/30* (2013.01); *G01C 21/165* (2013.01); *F16L 2101/30* (2013.01)

(58) Field of Classification Search
USPC .................................................. 33/505, 544
See application file for complete search history.

(56) References Cited

U.S. PATENT DOCUMENTS

| | | | | |
|---|---|---|---|---|
| 3,238,448 A | * | 3/1966 | Wood | G01N 27/902 324/219 |
| 3,718,978 A | * | 3/1973 | Van Koevering | G01M 3/005 73/866.5 |
| 3,755,908 A | | 9/1973 | VerNooy | |
| 3,882,606 A | * | 5/1975 | Kaenel | G01B 7/281 33/772 |
| 5,088,336 A | * | 2/1992 | Rosenberg | G01B 5/207 33/544 |
| 6,917,176 B2 | * | 7/2005 | Schempf | G01M 3/005 901/44 |
| 6,931,748 B2 | * | 8/2005 | Lam | G01B 7/281 33/542 |

FOREIGN PATENT DOCUMENTS

| | | | | |
|---|---|---|---|---|
| CN | 104763858 A | * | 7/2015 | |
| CN | 105318141 A | * | 2/2016 | ............ F16L 55/32 |
| CN | 106090530 A | * | 11/2016 | ............ F16L 55/40 |
| CN | 106704766 A | * | 5/2017 | ............ F16L 55/28 |
| CN | 107576316 A | | 1/2018 | |
| CN | 108071893 A | * | 5/2018 | |
| CN | 108488539 A | * | 9/2018 | ............ F16L 55/32 |
| CN | 108662352 A | * | 10/2018 | ............ F16L 55/32 |
| CN | 108758164 A | * | 11/2018 | ............ F16L 55/32 |
| CN | 108758165 A | * | 11/2018 | ............ F16L 55/32 |
| CN | 109780370 A | | 5/2019 | |
| CN | 110260881 A | | 9/2019 | |
| RU | 2111453 C1 | | 5/1998 | |
| WO | WO-2019132220 A1 | * | 7/2019 | ............ F16L 55/28 |

* cited by examiner controlling measuring robot to keep geometric center of inertial measurement unit on central axis of electronic bin, and move back and forth in pipeline, while controlling inertial measurement unit and encoder unit to collect measurement data — S71 comparing measurement data collected by inertial measurement unit and encoder to 3D curve data at reference time points of pipeline, and obtaining a deformation quantity of 3D curve of pipeline — S72

FIG. 7

PIPELINE THREE-DIMENSIONAL CURVE MEASURING ROBOT AND IMPLEMENTATION METHOD THEREFOR

CROSS-REFERENCE TO RELATED APPLICATIONS

This application is a national stage application of PCT Patent Application No. PCT/CN 2019/121384, filed on 28 Nov. 2019, which claims priority to Chinese Patent Application No. 201910054508.2, filed on 21 Jan. 2019, the content of all of which is incorporated herein by reference.

FIELD

The present disclosure relates to the technical field of engineering measurement and pipeline measurement, and, more particularly, to an inertial navigation/odometer based pipeline three-dimensional curve measuring robot and an implementation method therefor.

BACKGROUND

A pipeline is a common linear shaped channel structure, which can not only be applied to transporting a plurality of fluid substances, including transporting natural gas, oil, water and more, but also can be applied as a machine running channel, such as a soil structure deformation observation pipeline. A pipeline measurement generally refers to a measurement for a three-dimensional shape curve of a pipeline. A current commonly used pipeline measurement is generally aiming at a plurality of needs including management and inspection, and is applied to grasping a position and a trend of a pipeline, such as a petroleum pipeline measurement, an underground pipeline measurement, and more. According to a relative position relationship between an instrument and the pipeline, the pipeline measurement may be divided into an external measurement and an internal measurement, wherein the external measurement generally uses a plurality of methods including an electromagnetic wave, a sound wave, a tracer and more, to measure the position and the trend of the pipeline. However, due to a barrier of buried soil, accuracy thereof is generally poor, no more than a decimeter scale. The internal measurement generally adopts a measuring robot for a measurement. Currently, the measuring robot mostly adopts a sensors-combination of gyro/odometer, also, a mechanical structure thereof is applied to ensuring the measuring robot for measurement moving on a center line of the pipeline. However, due to a plurality of reasons including a mechanical structure design, a sensor device configuration, a calculation algorithm, and more, currently a highest measurement accuracy of a measuring robot measurement is mostly at a centimeter scale (within a pipeline length of 100 meters), which can only be applied in a conventional pipeline position and trend measurement. On a whole, an accuracy of an existing pipeline measurement technology can only reach the centimeter scale. However an accuracy requirement for a deformation monitoring is at a millimeter scale (within a pipeline length of 100 m), thus an existing measurement method and equipment cannot meet the requirement for the deformation monitoring of a pipeline.

Therefore, the current technology needs to be improved and developed.

SUMMARY

According to the above described defects, the purpose of the present disclosure is providing a pipeline three-dimensional curve measuring robot and an implementation method therefor, in order to solve a defect in the prior art that, the measurement accuracy of a measuring device is at the centimeter scale only, thus cannot meet the requirement for the deformation monitoring of a pipeline.

A technical solution of the present disclosure to solve the technical problems is as follows:

The present disclosure provides a first embodiment as a pipeline three-dimensional curve measuring robot, wherein comprising:

an electronic bin, a sliding rod connecting to a center of each of both sides of the electronic bin, a wheel bracket connecting to the sliding rod through a linear bearing, at least two sets of walking wheels evenly arrange on the wheel bracket, at least one set of odometer wheels having an independent retractable wheel bracket arranged on the sliding rod on one side, and an encoder installed on each of the odometer wheels; each of the sliding rod on each of both sides of the linear bearing has a spring installed;

the electronic bin has an inertial measurement unit (IMU), a collection control module and a power supply module arranged on a collection board inside the electronic bin;

each of the walking wheels makes a geometric center of the inertial measurement unit locate on a central axis of the electronic bin, by the springs contracting synchronously;

the collection control module, applied to controlling the inertial measurement unit and the encoder to collect a plurality of measurement data, and compares the measurement data with a plurality of three-dimensional curve data at a plurality of reference time points of the pipeline, and obtaining a deformation quantity of the three-dimensional curve of the pipeline.

Optionally, the collection control module further has an FPGA unit and a crystal oscillator unit arranged;

the inertial measurement unit connects to the FPGA unit through an RS-422 to LVTTL interface;

the FPGA unit establishes a communication connection with a host computer unit through a UART interface and a USB-to-serial interface respectively; applied to triggering and controlling the inertial measurement unit and the encoder to synchronously collect the measurement data and upload the measurement data collected to the host computer unit, according to a clock signal output from the crystal oscillator unit;

the host computer unit sends a data collection control instruction to the FPGA unit through the UART interface, and receives the measurement data through the USB-to-serial interface.

Optionally, each of both ends of the sliding rod has a power traction device arranged;

the power traction device comprises: a driving motor and an electric winch; the driving motor drives a cable on the electric winch to tow the measuring robot to move back and forth.

Optionally, a quantity of the walking wheels is three, and three of the walking wheels are arranged equally and symmetrically.

Optionally, a quantity of the odometer wheels is three, and three of the odometer wheels are arranged equally and symmetrically.

Optionally, the power supply module connects to all of the inertial measurement unit, the FPGA unit, the crystal oscillator unit, and the host computer unit.

The present disclosure further provides an implementation method of a measuring robot measuring the pipeline three-dimensional curve, wherein comprising:

controlling the measuring robot to move back and forth in the pipeline while keeping the geometric center of the inertial measurement unit being consistent with the central axis of the electronic bin, while controlling the inertial measurement unit and the encoder unit to collect the measurement data;

comparing the measurement data collected by the inertial measurement unit and the encoder to the three-dimensional curve data at the reference time points of the pipeline, and obtaining a deformation quantity of the three-dimensional curve of the pipeline.

Optionally, the step of controlling the measuring robot to move back and forth in the pipeline while keeping the geometric center of the inertial measurement unit being consistent with the central axis of the electronic bin further comprising:

each of the walking wheels achieves keeping the geometric center of the inertial measurement unit locating on the central axis of the electronic bin by the spring arranged on the sliding pole contracting synchronously, and at least one set of the odometer wheels on each independent contraction wheel bracket making an independent contraction;

through the power traction devices arranged on both ends of the sliding rode, the measuring robot is controlled to move back and forth in the pipeline.

Optionally, the collection board further has an FPGA unit, a crystal oscillator unit and a host computer unit arranged;

the method further comprises:

the FPGA unit triggers and controls the inertial measurement unit and the encoder to synchronously collect the measurement data and upload the measurement data collected to the host computer unit, according to the clock signal output from the crystal oscillator unit;

the host computer unit compares the measurement data received with the three-dimensional curve data at the reference time points of the pipeline, and the deformation quantity of the three-dimensional curve of the pipeline is then obtained.

Benefits: the present disclosure provides a pipeline three-dimensional curve measuring robot and an implementation method therefor, by tensioning the walking wheels synchronously, a measuring point of a pipeline measuring vehicle is kept always maintaining on the central axis of the pipeline, and by tensioning the odometer wheel independently, a high-precision mileage measurement is achieved, and by a high-precision integrated collection board, a synchronous data collection of a multi-path odometer and a high-precision inertial navigation is achieved. By an inertial navigation measuring device provided by the present disclosure, a measurement accuracy of the deformation in a pipeline three-dimensional curve at a millimeter-scale can achieved, and a requirement of monitoring the deformation can be satisfied.

BRIEF DESCRIPTION OF THE DRAWINGS

FIG. 7 illustrates an implementation method of measuring a pipeline three-dimensional curve by the measuring robot provided in the present disclosure.

DETAILED DESCRIPTION OF EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Aiming at a problem in the prior art that, a pipeline measuring device has a relatively low accuracy, the present disclosure provides a high-precision three-dimensional curve measuring robot for monitoring pipeline deformation, and an implementation method therefor. Specifically, the present disclosure applies the pipeline as a deformation monitoring device, which is buried in a deformation position to be monitored during constructing a civil structure, measuring a three-dimensional curve of the pipeline by a measuring robot for a pipeline, and comparing with a plurality of curves in different periods, to realize monitoring a structure deformation quantity.

Figure 1:
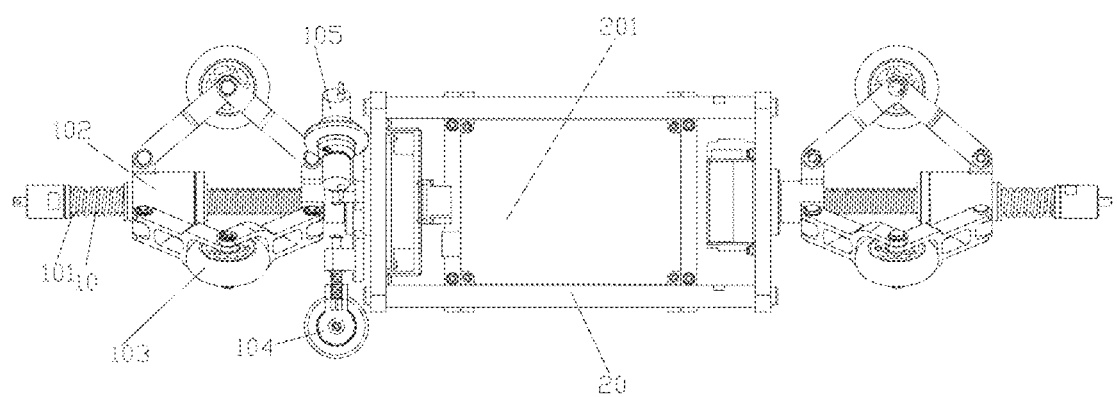
FIG. 1 illustrates a front view of a measuring robot provided by the present disclosure.

A first embodiment provided by the present disclosure is a pipeline three-dimensional curve measuring robot, shown as FIG. 1, comprising:

an electronic bin 20, a sliding rod 10 connecting to a center of each of both sides of the electronic bin 20, a wheel bracket connecting to the sliding rod 10 through a linear bearing 102, at least two sets of walking wheels 103 evenly distributed on the wheel bracket, at least one set of odometer wheel 104 having an independent retractable wheel bracket arranged on the sliding rod 10 on one side, and an encoder installed on each of the odometer wheels; each of the sliding rod 10 on each of both sides of the linear bearing 102 has a spring 101 installed;

in the electronic bin 20, it has an inertial measurement unit 201, a collection control module and a power supply module arranged;

each set of the walking wheel 103 makes a geometric center of the inertial measurement unit 201 be consistent with a central axis of the electronic bin 20, by the springs contracting synchronously;

the collection control module controls the inertial measurement unit 201 and the encoder 105 to collect a plurality of measurement data, and compares the measurement data with a plurality of three-dimensional curve data at a plurality of reference time points of the pipeline, before obtaining a deformation quantity of the three-dimensional curve of the pipeline.

The measuring robot provided by the present disclosure has the electronic bin arranged, the walking wheels and the odometer wheels are arranged on the sliding poles on both sides of the electronic bin. The electronic bin is arranged at a center of the measuring robot as a whole, while a center of the inertial measurement unit arranged on a collection board locates on a central axis of the electronic bin, and locates also on a central axis of the pipeline.

Walking wheels are arranged on both sides of the electronic bin after being synchronously tensioned, each side has at least one set of walking wheels arranged, each set of walking wheels has three walking wheels equally distributed, the walking wheels 103 are mounted on the wheel bracket, a wheel of the walking wheel 103 is made of a wear-resistant resin material with a suitable hardness. The wheel bracket connects to the sliding rod through the linear bearing 102, and each end of the linear bearing 102 on the sliding rod 10 has a spring arranged, making the three walking wheels contract synchronously, and ensuring that the wheel bracket is tensioned in the pipeline, so a central axis of a frame is consistent with the central axis of the pipeline. An elasticity of the spring on the sliding rod 10 is adjustable, that ensures the walking wheels be able to strictly fit a wall of the pipeline.

On each odometer wheel 104, there is an encoder 105 installed one-to-one correspondently; the encoder 105 converts a mechanical geometric displacement on an output shaft of the odometer wheel into a pulse or a digital quantity through a photoelectric conversion, before transmitting the pulse or the digital quantity to the collection control module connected. The sliding rods 10 on both ends of the linear bearing 102 has a spring 101 arranged.

Figure 2:
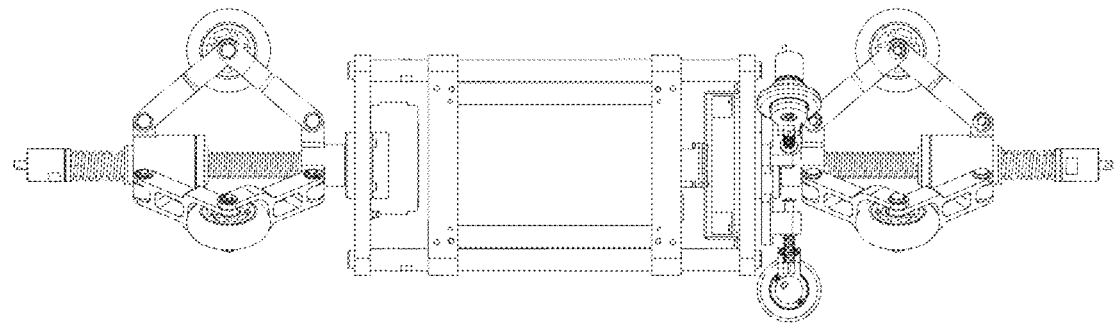
FIG. 2 illustrates a rear view of the measuring robot provided by the present disclosure.
Figure 3:
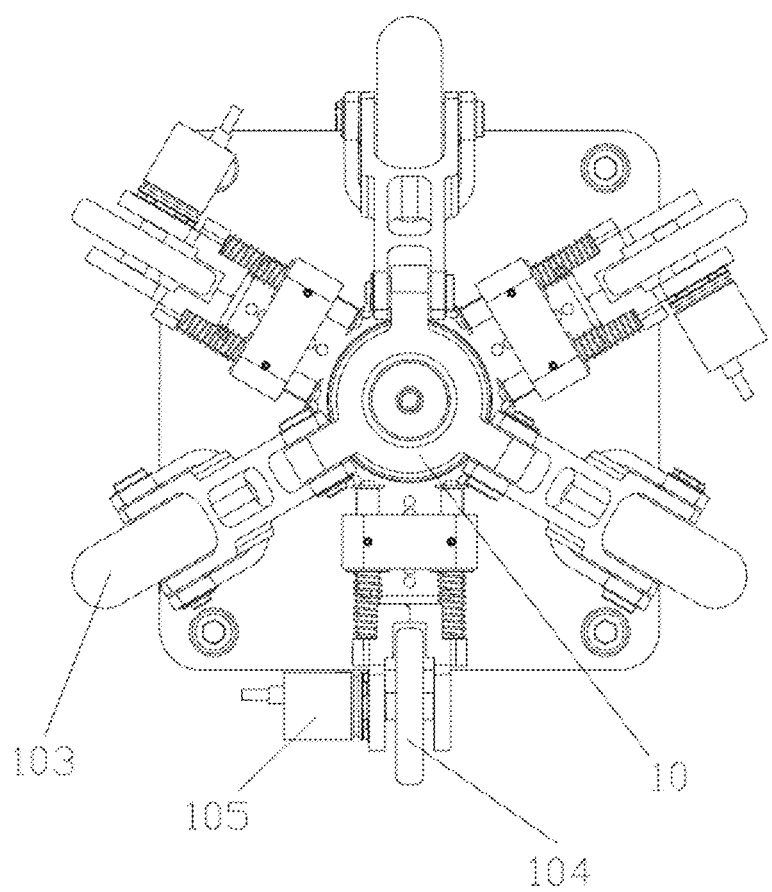
FIG. 3 illustrates a left view of a measuring robot provided by the present disclosure.
Figure 4:
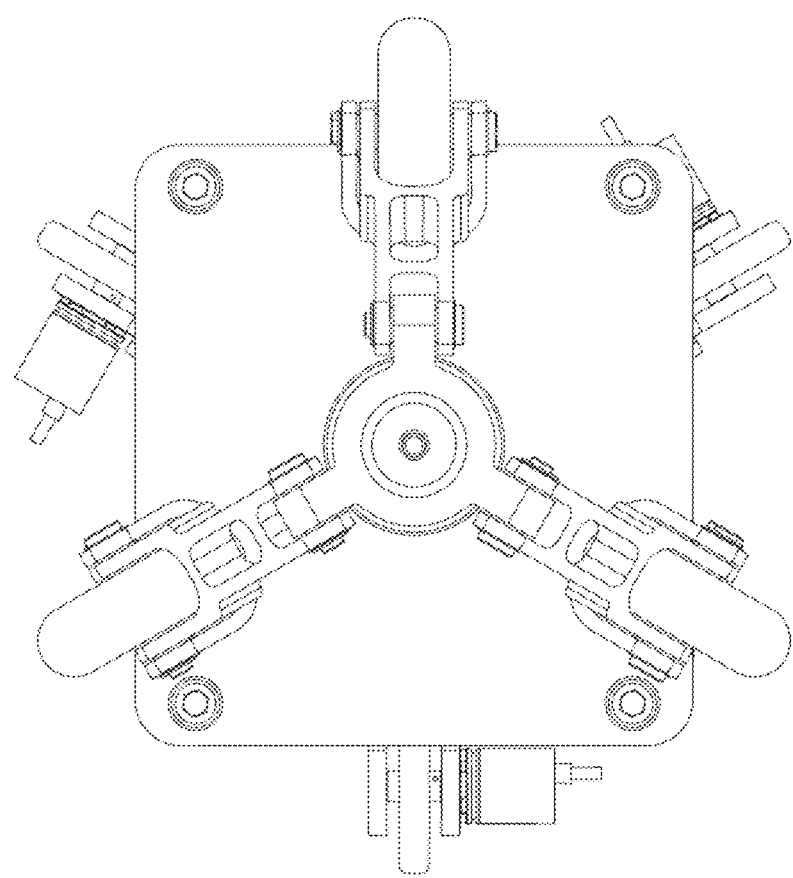
FIG. 4 illustrates a right view of a measuring robot provided by the present disclosure.

Combing together the rear view of the measuring robot shown in FIG. 2, the left view shown in FIG. 3 and the right view shown in FIG. 4, in a specific embodiment, a set of the walking wheels (each set comprising three walking wheels) and a set of the odometer wheels are selected, the three walking wheels comprised in each set are evenly distributed, and the three odometer wheels comprised in each set of the odometer wheels are evenly distributed, while the three walking wheels are synchronously tensioned by the wheel bracket thereof and the spring arranged between both ends of the wheel bracket, thereby a geometric center of the measuring robot and a center of the pipeline are kept consistent. The odometer wheel is independently tensioned, so as to ensure that it closely adheres to an inner wall of the pipeline during a measurement, to ensure the measurement data accurate.

Figure 5:
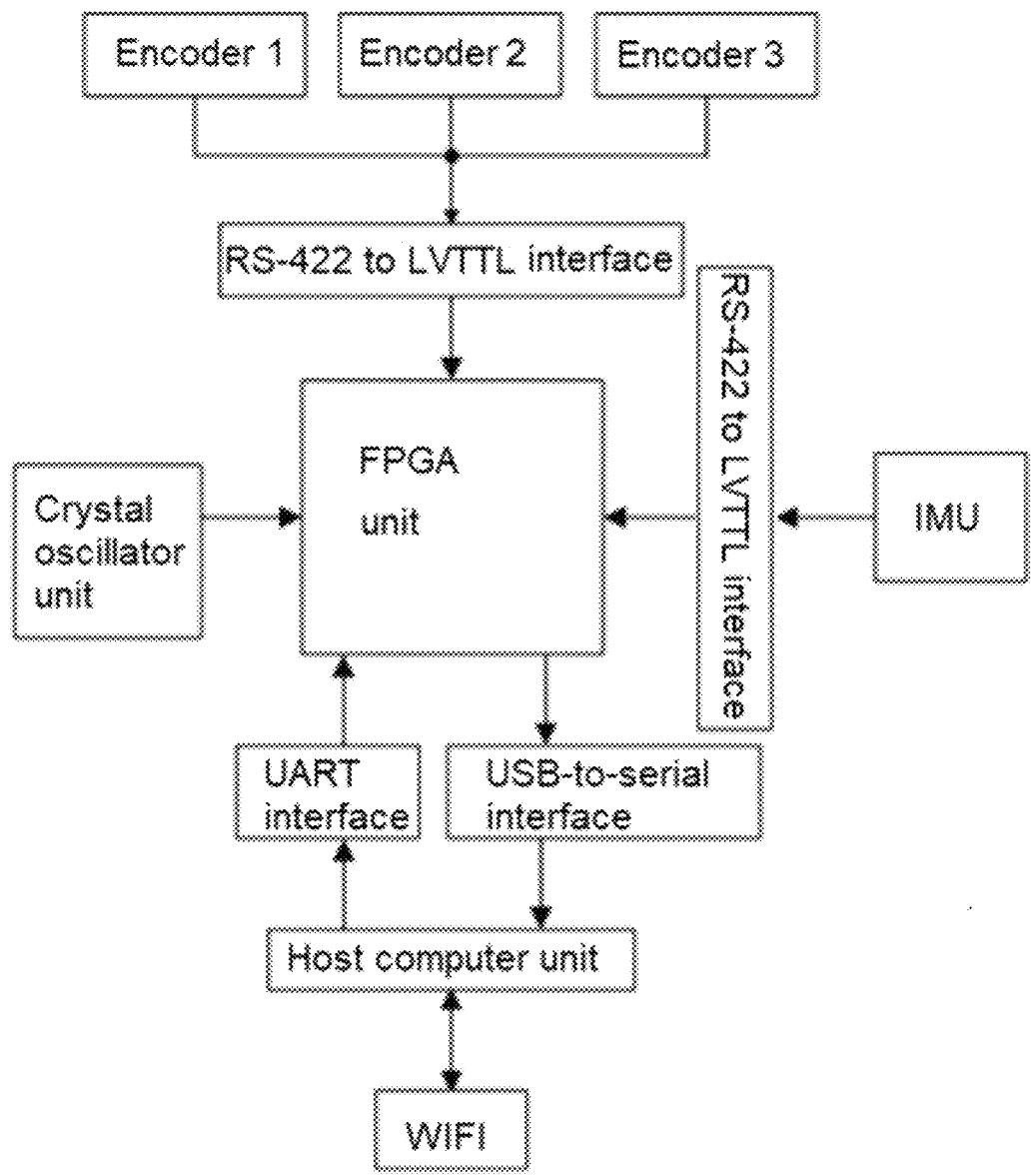
FIG. 5 illustrates realization logic for high-precision synchronization of multi-sensors in the measuring robot for a pipeline provided by the present disclosure.

The collection board has an FPGA unit and a crystal oscillator unit arranged;
  combining with FIG. 5, the inertial measurement unit arranged on the correction board connects to the FPGA unit through an RS-422 to LVTTL interface; the FPGA unit establishes a communication connection with a host computer unit through a UART interface and a USB-to-serial interface respectively.

The FPGA unit triggers and controls the inertial measurement unit and the encoder to synchronously collect the measurement data and upload the measurement data collected to the host computer unit, according to a clock signal output from the crystal oscillator unit;
  the host computer unit sends a data collection control instruction to the FPGA unit through the UART interface, and receives the measurement data through the USB-to-serial interface.

The collection board further has a power supply module arranged to supply power, the power supply module connects to all of the inertial measurement unit, the FPGA unit, the crystal oscillator unit, and the host computer unit.

A multi-sensor integrated measurement system arranged on the collection board is a core of the measuring robot. In the electronic bin, the multi-sensor integrated measurement system is composed of a plurality of modules including a core control of the FPGA unit, the crystal oscillator unit having a high-precision time reference source, the inertial measurement unit, the host computer unit, the power supply module and more. In the present disclosure, an FPGA unit is adopted to integrate the inertial measurement unit and a three-way high-precision encoder. Specifically, a high steady-voltage and temperature-control supplied quartz crystal having a frequency temperature stability of 1 ppm is used as a system time reference source. It takes time as a trigger source to trigger data synchronization by the FPGA unit, to control the inertial measurement unit (IMU) and a photoelectric encoder to simultaneously collect and upload the measurement data.

The host computer unit sends out a collection control instruction to the
FPGA unit through the UART interface first. And after receiving a trigger command, the FPGA unit uploads a plurality of pipeline measurement data to the host computer unit for analysis and storage through the USB-to-serial interface according to an established protocol in a real time. The collection control module realizes a synchronous collection and transmission control for a plurality of data from the multi-sensors, having a strong anti-interference ability. Achieving time synchronization among multi-sensors at a microsecond scale, through a characteristic of parallel control of the FPGA unit, is a hardware basis for a high-precision data fusion.

Figure 6:
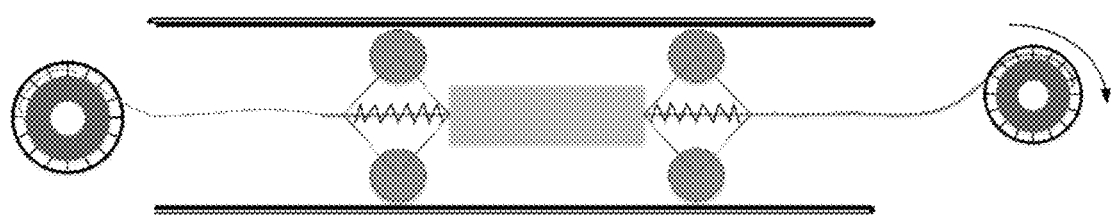
FIG. 6 illustrates a schematic diagram on a structure of a power traction device in the measuring robot provided by the present disclosure.

In order to make the measuring robot move in the pipeline, as shown in FIG. 6, the sliding rod has a power traction device arranged on each of both ends thereof; the power traction device comprises: a driving motor and an electric winch; the driving motor drives a cable on the electric winch to tow the measuring robot to move back and forth.

Specifically, a winch composed of a small automated motor and a strong thin fiber cable is applied as a traction power for the measuring robot. During an operation, a motion of the measuring robot is controlled by controlling a motion of the driving motor. By arranging an electric winch on each of both ends of the pipeline, the measuring robot may reciprocate in the pipeline and perform multiple measurements. Rebuilding the power traction device with a programmable driving servo motor, it is able to realize an automatic movement and measurement of the measuring robot.

An operation of the measuring robot is divided into three stages, comprising a preparation stage, a measurement stage and an ending stage. During the preparation stage of a measurement, the electric winches are placed at both ends of the pipeline to be tested, and threading a cable of strong thin fiber on the electric winch into the pipeline by a threader, before connecting the cable to a universal pull ring at each of both ends of the measuring robot for the pipeline. During the measurement stage, a power switch of a measuring robot is turned on, and the measuring robot rests for 5-10 minutes at a nozzle of the pipeline for an initialization. After the initialization, a state of one winch working and one winch rotating is ensured, so the measuring robot can move back and forth multiple times in the pipeline, to achieve a plurality of measurements in a same pipeline section for deformation monitoring. At an end of the measurement, it is ensured that the measuring robot stays stationary in a pipeline for 5-10 minutes. During the ending stage, the measuring robot is taken out and the cable on the electric winch is untied.

A second embodiment provided by the present disclosure is an implementation method of a measuring robot measuring the pipeline three-dimensional curve, shown as FIG. 7, comprising:

step S71, controlling the measuring robot to keep the geometric center of the inertial measurement unit on the central axis of the electronic bin, and move back and forth in the pipeline, while controlling the inertial measurement unit and the encoder unit to collect the measurement data.

In the present step, specifically, by arranging the power traction device on both ends of the sliding rod, the measuring robot is controlled to move back and forth; the power traction device comprises: a driving motor and an electric winch; the driving motor drives a cable on the electric winch to tow the measuring robot to move back and forth. In order to ensure an accuracy of the measurement data, it is further necessary to ensure that the geometric center of the inertial measurement unit is located on the central axis of the electronic bin.

Step S72, comparing the measurement data collected by the inertial measurement unit and the encoder to the three-dimensional curve data at the reference time points of the pipeline, and obtaining a deformation quantity of the three-dimensional curve of the pipeline.

Specifically, the step of controlling the measuring robot to keep the geometric center of the inertial measurement unit on the central axis of the electronic bin, and to move back and forth in the pipeline, further comprising:
  each of the walking wheels achieves keeping the geometric center of the inertial measurement unit locating on the central axis of the electronic bin by the spring arranged on the sliding pole contracting synchronously, and at least one set of the odometer wheels on each independent contraction wheel bracket making an independent contraction;
  through the power traction devices arranged on both ends of the sliding rode, the measuring robot is controlled to move back and forth in the pipeline.

Specifically, in order to ensure a collection of the measurement data smooth and a data transmission, the collection board further has an FPGA unit and a crystal oscillator unit arranged;

The method further comprises:
  the FPGA unit triggers and controls the inertial measurement unit and the encoder to synchronously collect the measurement data and upload the measurement data collected to the host computer unit, according to the clock signal output from the crystal oscillator unit;
  the host computer unit compares the measurement data received with the three-dimensional curve data at the reference time points of the pipeline, and the deformation quantity of the three-dimensional curve of the pipeline is then obtained.

Benefits: The present disclosure provides a pipeline three-dimensional curve measuring robot and an implementation method therefor. The measuring robot comprises: an electronic bin, a sliding rod connecting to a center of each of both sides of the electronic bin, a wheel bracket connecting to the sliding rod through a linear bearing, at least two sets of walking wheels equally distributed on the wheel bracket, at least one set of odometer wheels having an independent retractable wheel bracket arranged on the sliding rod on one side, and an encoder installed on each of the odometer wheels; inside the electronic bin, there is an inertial measurement unit arranged on a collection board. When making a measurement, the measuring robot is controlled to keep the geometric center of the inertia measuring unit locating on the center axil of the electronic bin before moving back and forth in the pipeline, while the inertia measuring unit collects the measuring data at a same time; comparing the measurement data collected by the inertial measurement unit and the encoder to the three-dimensional curve data at the reference time points of the pipeline, a deformation quantity of the three-dimensional curve of the pipeline is achieved. By tensioning the walking wheels synchronously, a measuring point of a pipeline measuring vehicle is always kept on the central axis of the pipeline, and by tensioning the odometer wheel independently, a high-precision odometer measurement is achieved, while by a high-precision integrated collection board, a synchronous data collection from a multi-path odometer and a high-precision inertial navigation is achieved. By an inertial navigation measuring device disclosed in the present disclosure, measurement accuracy at a millimeter-scale of the deformation in a pipeline three-dimensional curve can achieved, and a requirement on monitoring the deformation can be satisfied.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A pipeline three-dimensional curve measuring robot, comprising:
  an electronic bin, a sliding rod connecting to a center of each of both sides of the electronic bin, a wheel bracket connecting to the sliding rod through a linear bearing, at least two sets of walking wheels evenly distributed on the wheel bracket, at least one set of odometer wheels having an independent retractable wheel bracket arranged on the sliding rod on one side, and an encoder installed on each of the odometer wheels; each of the sliding rods on each of both sides of the linear bearing has a spring installed;
  the electronic bin has an inertial measurement unit, a collection control module, and a power supply module, arranged inside the electronic bin;
  each set of the walking wheels makes a geometric center of the inertial measurement unit locate on a central axis of the electronic bin, by the springs contracting synchronously; and
  the collection control module controls the inertial measurement unit and the encoder to collect synchronously a plurality of measurement data, and compares a plurality of three-dimensional curves solved from the measurement data with a plurality of three-dimensional curve data at a plurality of reference time points of the pipeline, and obtains a deformation quantity of the three-dimensional curve of the pipeline.

2. The measuring robot according to claim 1, wherein the collection control module comprises: an FPGA unit, a crystal oscillator unit and a host computer unit;
  the inertial measurement unit connects to the FPGA unit through an RS-422 to LVTTL interface;
  the FPGA unit establishes a communication connection with the host computer unit through a UART interface and a USB-to-serial interface respectively; applied to triggering and controlling the inertial measurement unit and the encoder to synchronously collect the measurement data and upload the measurement data collected to the host computer unit, according to a clock signal output from the crystal oscillator unit; and the host computer unit sends a data collection control instruction to the FPGA unit through the UART interface, and receives the measurement data through the USB-to-serial interface.

3. The measuring robot according to claim 2, wherein a quantity of the walking wheels is three, and three of the walking wheels are arranged equally and symmetrically.

4. The measuring robot according to claim 2, wherein each of both ends of the sliding rod has a power traction device arranged; and the power traction device comprises: a driving motor and an electric winch; the driving motor drives a cable on the electric winch to tow the measuring robot to move back and forth.

5. The measuring robot according to claim 4, wherein a quantity of the odometer wheels is three, and three of the odometer wheels are arranged equally and symmetrically.

6. The measuring robot according to claim 4, wherein the power supply module connects to each of the inertial measurement unit, the FPGA unit, the crystal oscillator unit, and the host computer unit.

7. The measuring robot according to claim 1, wherein each of both ends of the sliding rod has a power traction device arranged; and the power traction device comprises: a driving motor and an electric winch; the driving motor drives a cable on the electric winch to tow the measuring robot to move back and forth.

8. The measuring robot according to claim 7, wherein a quantity of the odometer wheels is three, and three of the odometer wheels are arranged equally and symmetrically.

9. The measuring robot according to claim 7, wherein the power supply module connects to each of the inertial measurement unit, the FPGA unit, the crystal oscillator unit, and the host computer unit.

10. An implementation method of measuring the pipeline three-dimensional curve by the measuring robot according to claim 1, wherein comprising:

controlling the measuring robot to move back and forth in the pipeline while keeping the geometric center of the inertial measurement unit locating on the central axis of the electronic bin, and controlling the inertial measurement unit and the encoder unit to collect the measurement data;

comparing the three-dimensional curve solved from the measurement data collected by the inertial measurement unit and the encoder to the three-dimensional curve data at the reference time points of the pipeline, and obtaining a deformation quantity of the three-dimensional curve of the pipeline.

11. The implementation method according to claim 10, wherein the step of controlling the measuring robot to move back and forth in the pipeline while keeping the geometric center of the inertial measurement unit being consistent with the central axis of the electronic bin further comprises:

each of the walking wheels achieves keeping the geometric center of the inertial measurement unit being consistent with the central axis of the electronic bin by the spring arranged on the sliding pole contracting synchronously, and at least two of the odometer wheels on each independent contraction wheel bracket making an independent contraction; and through the power traction devices arranged on both ends of the sliding rode, the measuring robot is controlled to move back and forth in the pipeline.

12. The implementation method according to claim 10, wherein the collection board further has an FPGA unit, a crystal oscillator unit and a host computer unit; and the method further comprises:

the FPGA unit triggers and controls the inertial measurement unit and the encoder to synchronously collect the measurement data and upload the measurement data collected to the host computer unit, according to a clock signal output from the crystal oscillator unit; and the host computer unit compares the three-dimensional curve solved from the measurement data received with the three-dimensional curve data at the reference time points of the pipeline, and the deformation quantity of the three-dimensional curve of the pipeline is obtained.

\* \* \* \* \*